US007010299B2

(12) United States Patent
Wilson (10) Patent No.: US 7,010,299 B2
(45) Date of Patent: Mar. 7, 2006

(54) METHOD AND APPARATUS FOR MOBILITY IN WLAN SYSTEMS

(75) Inventor: Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 260 days.

(21) Appl. No.: 10/718,205

(22) Filed: Nov. 20, 2003

(65) Prior Publication Data

US 2005/0113086 A1   May 26, 2005

(51) Int. Cl.
*H04Q 7/20* (2006.01)
(52) U.S. Cl. .................. 455/436; 442/445; 442/422.1; 442/432.1; 442/428; 370/338; 370/401
(58) Field of Classification Search ............ 455/432.1, 455/435.1, 435.2, 436–439, 442–43, 422.1, 455/428; 370/338, 351, 352, 401
See application file for complete search history.

(56) References Cited

U.S. PATENT DOCUMENTS

| 2001/0021175 | A1* | 9/2001 | Haverinen ............... 370/352 |
| 2002/0025817 | A1* | 2/2002 | Karino et al. ............ 455/445 |
| 2002/0049059 | A1* | 4/2002 | Soininen et al. ......... 455/439 |
| 2003/0026220 | A1* | 2/2003 | Uhlik et al. ............. 370/328 |
| 2003/0224758 | A1* | 12/2003 | O'Neill et al. ........... 455/411 |
| 2003/0224788 | A1* | 12/2003 | Leung et al. ............ 455/435.1 |
| 2004/0097232 | A1* | 5/2004 | Haverinen ............... 455/436 |
| 2004/0203752 | A1* | 10/2004 | Wojaczynski et al. ... 455/432.1 |
| 2004/0264451 | A1* | 12/2004 | Kujala et al. ............ 370/401 |
| 2005/0036510 | A1* | 2/2005 | Sarikaya et al. ......... 370/401 |
| 2005/0105490 | A1* | 5/2005 | Lee et al. ............... 455/436 |
| 2005/0111437 | A1* | 5/2005 | Maturi ................... 370/352 |

OTHER PUBLICATIONS

3rd Generation Partnership Project 2, Wireless IP Network Standard 3GPP2.S0001-A-1 Version 1.0, Version Date: Dec. 15, 2002.
IP Mobility Support for IPv4, Network Working Group, Request for Comments:3220, Obsolets:2002, Category: Standards Track, C.Perkins, Ed., Nokia Research Center , Jan. 2002.
$3^{rd}$ Generation Partnership Project 2, Wireless IP Architecture Based on IETF Protocols, 3GPP2P.R0001, Version 1.0.0, Version Date: Jul. 14, 2000.
R.Ramjee, T.LaPorta, S.Thuel, K.Varadhan, HAWAII: A Domain-based Approach for Supporting Mobility in a Wide-area Wireless Networks.
Proxim, The Capacity to Do Great Things, Bellagio Architecture, Nov. 2002.

* cited by examiner

*Primary Examiner*—Joseph Feild
*Assistant Examiner*—Kamran Afshar (57) ABSTRACT

A method (400, 500, 800), and apparatus (212, 230, 240) provide for mobility in WLAN voice systems. In one embodiment a processor (651) coupled to a memory (652) and a radio resource (653) determines from that client (150) should move, based for example on a signal parameter, to an adjacent MSN (240). Adjacent MSNs are discovered and a modification of a portion of a tunnel switched path to the adjacent MSN is made and a portion released after the modified path is established. Information is transferred to client 150 over the tunnel using a lower layer address such as a MAC address.

25 Claims, 5 Drawing Sheets

FIG. 1

-PRIOR ART-

METHOD AND APPARATUS FOR MOBILITY IN WLAN SYSTEMS

FIELD OF THE INVENTION

The present invention relates in general to communications systems and more specifically to a methods and apparatus for providing mobility for communication units from one wireless Mobility Service Node (MSN) to another within a wireless local area network.

BACKGROUND OF THE INVENTION

In a WLAN system involving multiple access points (AP)s, it is desirable to provide uninterrupted service when the mobility or movement of network devices, communications units, mobile phones, subscriber devices, or the like, requires a transfer of service from one AP associated with the WLAN to another. Such transfers or handovers are of particular importance for real time or time critical data, such as voice or the like, since interruptions of data traffic associated therewith might result in a degradation of quality or interruption or dropping of a voice conversation. Thus, a requirement for mobility in WLAN systems is that a traffic interruption associated with voice or other real-time data resulting from an AP-to-AP handover must be eliminated or be reduced to an insignificant amount so as not to affect the quality of, for example, a voice conversation or like real time network data transaction.

Important considerations should be made when attempting to provide WLAN mobility including: 1) additional software, e.g. Mobile-IP related software, in mobile network elements, or clients, should not be required so that terminal costs are maintained at a minimum, 2) all services associated with the WLAN should be supported, 3) the deployment of additional hardware should not be required in the WLAN, 4) manual configuration should be avoided, 5) dynamic address assignment, e.g. DHCP, should be supported, and 6) a variety of wired and wireless configurations of the WLAN should be flexibly supported. Of course, other considerations may also be important.

Problems arise however, in that many solutions available for providing mobility fail to support key considerations such as, for example, those listed above or additional considerations. For example, in conventional WLANs, APs act as bridges such that while mobility between APs on the same subnet is possible, traffic interruptions may be too long. Traffic interruptions may be worsened by the addition of, for example, 802.1x authentication or the like such as Lightweight Extensible Access Protocol (LEAP).

Thus a need exists for solutions to the mobility issues noted above and additional problems such as cost containment and the like.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

In overview, the present disclosure concerns electronic devices such as mobile capable wireless communications units in a mobility capable wireless environment, and the like, and a method and apparatus for providing or facilitating mobility for such devices or communications units, where mobility generally refers to seamless service when or as a communications unit physically moves or changes location. Mobility may be provided by the placement of mobility aware nodes or network units, such as Mobility Service Nodes (MSN)s, in one or more layers within the hierarchy of the WLAN. In particular, various exemplary embodiments are discussed and described to provide, for example, a layer 3 mobility awareness in layer 2 connected devices. Wireless communications units often referred to as subscriber devices, such as cellular or mobile phones, two-way radios, messaging devices, personal digital assistants, personal assignment pads, and personal computers equipped for wireless operation, a cellular handset or device, or the like, or equivalents thereof may correspond to the wireless communication units, e.g. WLAN mobility clients, described herein provided such units are arranged and constructed for operation in accordance with the various inventive concepts and principles embodied in network elements, networks, systems, electronic devices or communications units, and methods for providing, initiating, or facilitating mobility of the wireless communication units as discussed and described herein.

The principles and concepts discussed and described may be particularly applicable to wireless communication units, devices, and systems providing or facilitating mobility in devices or systems with short range communications capability normally referred to as W-LAN capabilities. Such capabilities can be provided by implementing standards, such as various IEEE 802.xx, Bluetooth, or Hiper-LAN and the like or variants or evolutions thereof, preferably utilizing CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As described in greater detail hereinafter, various inventive principles are employed to facilitate the mobility of a communication unit during a communication, for example, between the communication unit and a host. It will be appreciated that the communication is preferably established over a tunnel switched path carrying information associated with the communication session between the communication unit and the host. An impending move to an adjacent MSN can from time to time be desired for the mobility of the communication unit and the likelihood of such a move can be determined. When a move is determined to be impending, a modification of the tunnel switched path may be initiated whereupon the tunnel switched path may be modified to form a modified tunnel switched path associated with the adjacent MSN. It should be noted that information is preferably transferred to the adjacent MSN on the modified tunnel switched path while information is also transferred on the tunnel switched path prior to modification, such as to an Edge Mobility Service Node (E-MSN), where edge refers to the MSN nearest the wireless communication unit. The tunnel switched path may be released after the modified tunnel switched path is established in accordance with various exemplary embodiments as will be described in greater detail hereinafter. Accordingly, traffic interruptions and the like may be avoided, provided these principles or equivalents thereof are followed.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
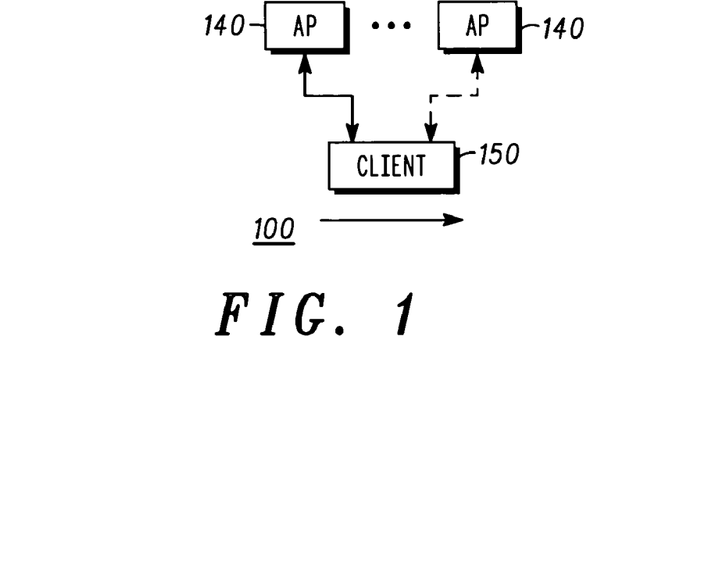
FIG. 1 is a block diagram depicting an exemplary embodiment of a communication unit exercising mobility between APs.

To better understand the principals and concepts associated with the Radio Access Network (RAN) topology described herein, FIG. 1 shows a simplified block diagram of a mobility client 150 moving (signified by arrow) from AP 140 to another AP 140 within, for example, a WLAN service environment 100. It will be appreciated that in accordance with various exemplary embodiments, the movement of client 150 may occur preferably anywhere within the network, but is typically located at the terminus of the wireline network or "edge" thereof, allowing client 150 to move freely in areas where wireline service is limited or in areas where mobility is simply preferred by client 150. It will also be appreciated that various principals described herein may be practiced in networks which are exclusively wireless and operate in accordance with various standard and proprietary protocols, such as IP and IP-related protocols.

Figure 2:
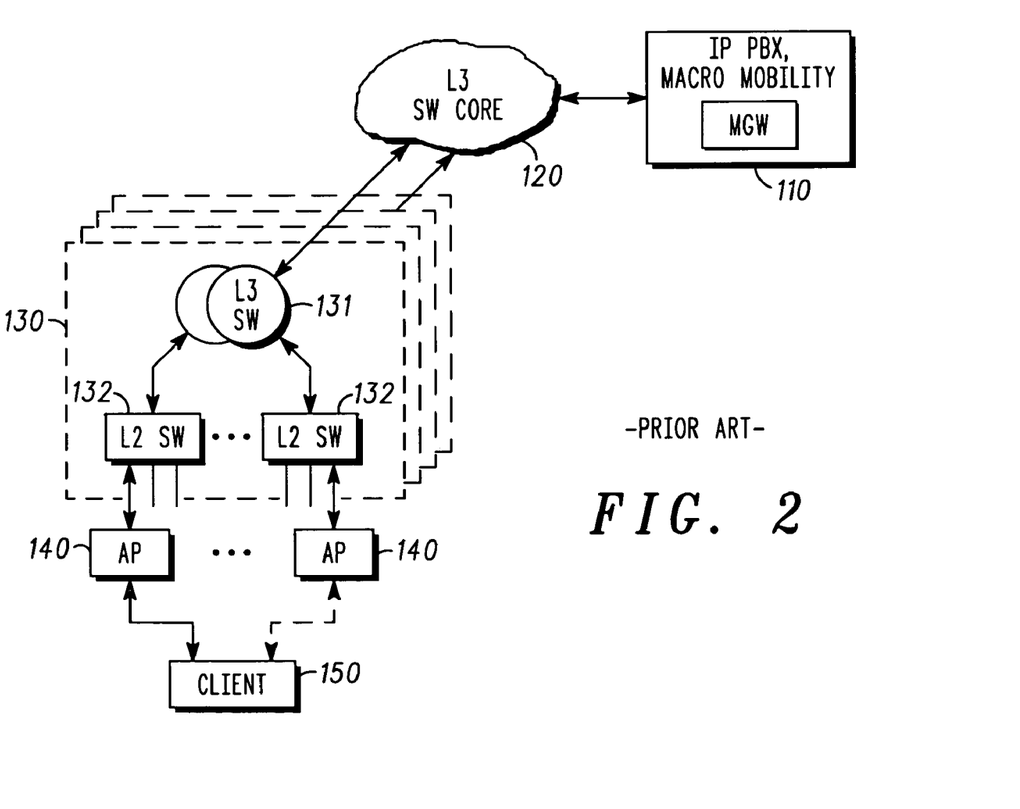
FIG. 2 is a block diagram depicting components of an exemplary conventional WLAN architecture.

FIG. 2 shows a typical architecture, such as an Enterprise intranet architecture, that in some embodiments includes a layered architecture. This layered architecture is an architecture having Access, Distribution, Core, and Server layers such as are generally accepted in the industry, and includes, for example, non-mobility host 110 at a Server layer, core switch 120 to provide switching of level 3 protocol units, a distribution layer process 130, which, as would be appreciated by one of ordinary skill in the art, may be a hardware module, software module or the like for distributing, e.g. switching level 3 protocol units at level 3 switch 131 and level 2 protocol units at level 2 switch 132. Wireless Access Points (APs) 140 which may be conventional 802.11x APs, may be configured to service clients or wireless communication units 150 that are mobility capable.

To achieve mobility in conventional systems, such as that illustrated in FIG. 2, some conventional approaches are used with varying degrees of success. For example, one present state-of-the-art approach for providing mobility includes configuring APs 140 in WLAN environment 100 to act as bridges. Mobility between APs 140 within a same subnet, while possible, results in long traffic interruptions which are often so long as to inhibit communications particularly where voice or other real-time or near real-time data packets, e.g. voice over IP (VoIP), real time video, are being transmitted. Traffic delays are lengthened when 802.1x authentication such as LEAP is used. Other systems, such as for example, the Harmony system by PROXIM, Inc. of Sunnyvale Calif., are available. In accordance with Harmony, one or more AP 140s may connect themselves, via IP tunnels to be described in greater detail hereinafter, to one AP 140 acting as a controller. It will be appreciated that while only two APs 140 are shown, other entities, such as an access point controller, can be present to facilitate tunneling.

Figure 3:
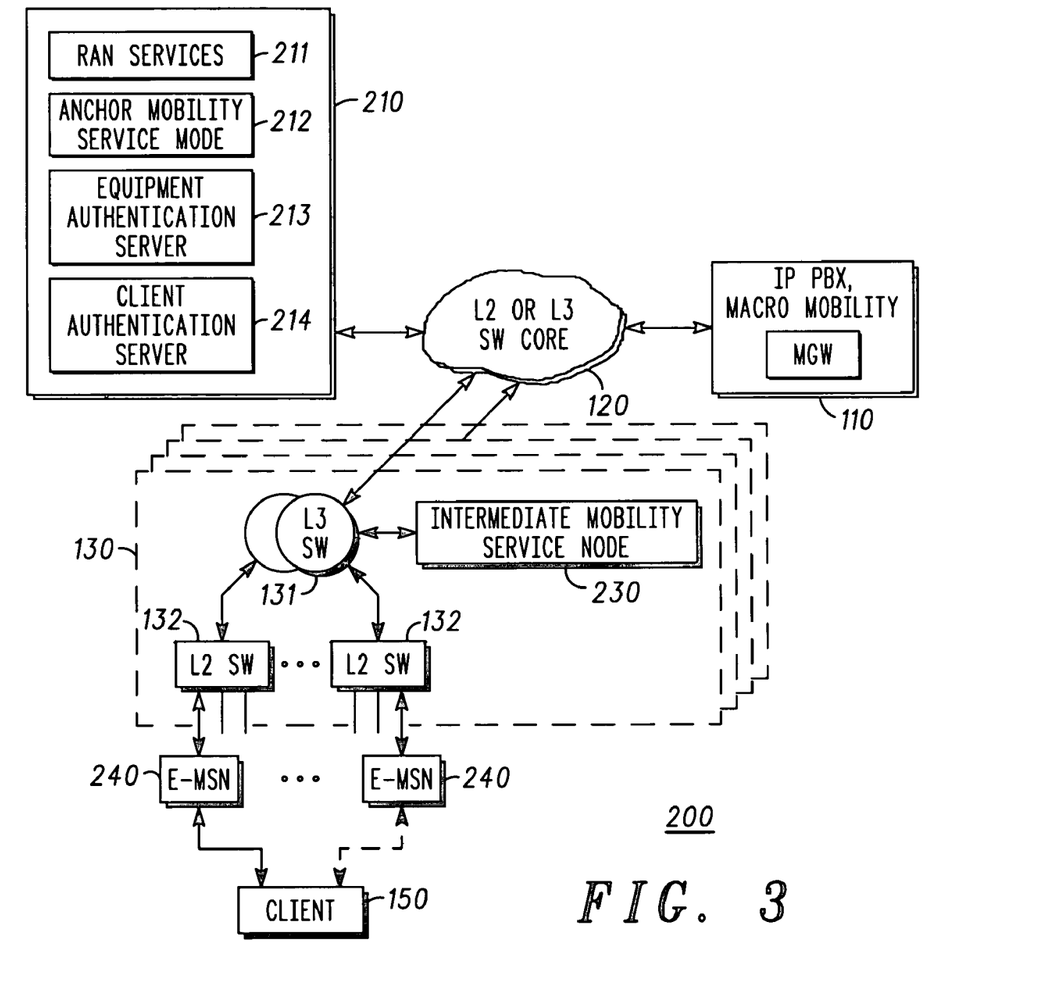
FIG. 3 is a block diagram depicting components an exemplary WLAN architecture including components suitable for implementing mobility in accordance with various exemplary embodiments.

Thus in accordance with various embodiments, exemplary mobility components or MSNs, which may be added within an otherwise conventional network architecture, are shown in FIG. 3. It should be noted that the added elements include Radio Access Network (RAN) node 210 including RAN services 211, Anchor Mobility Service Node (A-MSN) 212, Equipment Authentication Server 213, and Client Authentication Server 214; Intermediate Mobility Service Node (I-MSN) 230, and Edge Mobility Service Nodes (E-MSN) 240. The functions of the various elements are described in further detail herein below.

In accordance with various exemplary embodiments, E-MSN 240 performs a number of functions such as implementing the 802.11a/b/g Over the Air (OTA), physical (PHY) and Media Access Control (MAC) protocols. E-MSN 240 further may provide Edge security by implementing, for example, 802.11i security functions, including functioning as 802.1x authenticator. E-MSN 240 may further implement 802.11e Hybrid Coordination Function (HCF) to provide OTA Quality of Service (QoS) levels. It will further be appreciated that Radio Resource Management may be provided by E-MSN 240 in cooperation with the client 150, by implementing, for example, measurement and decision algorithms associated with handover and reselection. E-MSN 240 may further implement Dynamic Frequency Selection algorithms to select its operational frequency. In accordance with various exemplary embodiments, E-MSN 240 sets up mobility tunnels towards higher-level mobility service nodes such as I-MSN 230 and A-MSN 212 as will be described in greater detail hereinafter. E-MSN 240 further participates in signaling between other MSNs to implement handover of active flows such as modification of tunnel switched paths which provide mobility while maintaining QoS over the OTA interface and throughout the wireline network.

It will be appreciated by one of ordinary skill in the art that in accordance with various exemplary embodiments, I-MSN 230 preferably terminates tunnels between E-MSNs, other I-MSNs, and A-MSNs. I-MSN 230 participates in signaling flows between, for example, E-MSNs associated with mobility related handover.

A-MSN 212 preferably functions as a mobility anchor point like, for example a home access (HA) device. A-MSN 212 preferably assigns IP addresses to mobile clients through for example the E-MSN 240 serving the mobile client and may further run routing protocols such as Open Shortest Path First (OSPF), Routing Information Protocol (RIP), or the like towards an exemplary fixed network, such as upstream from A-MSN 212, to attract packets for mobile clients at the assigned IP address. It should be appreciated that in accordance with various exemplary embodiments, the IP address assigned by A-MSN 212 will not change, at least during the mobility session, from the perspective of the fixed network, such that packets or other information and signaling will continue to be directed to the mobile client at the assigned IP address regardless of movement as will be described in greater detail hereinafter. A-MSN 212 may also participate in signaling flows between MSNs for handover purposes.

As also shown within RAN node 210 is Equipment Authentication Server 213 which supports security functions between RAN service elements. It will be appreciated that Equipment Authentication Server 213 may preferably be a Kerberos authentication server (AS), ticket granting server (TGS), or the like. Also located in RAN node 210 is Client Authentication Server 214 which is preferably a 802.1x authentication server such as a RADIUS server or the like as would be known in the art. It will be appreciated by one of ordinary skill that Client Authentication Server 214 may be required to internetwork or interoperate between RADIUS and, for example, Global System Mobile (GSM) media access protocol (MAP) for Extensible Authentication Protocol (EAP) Service Identity Module/User Service Identity Module (SIM/USIM).

Figure 4:
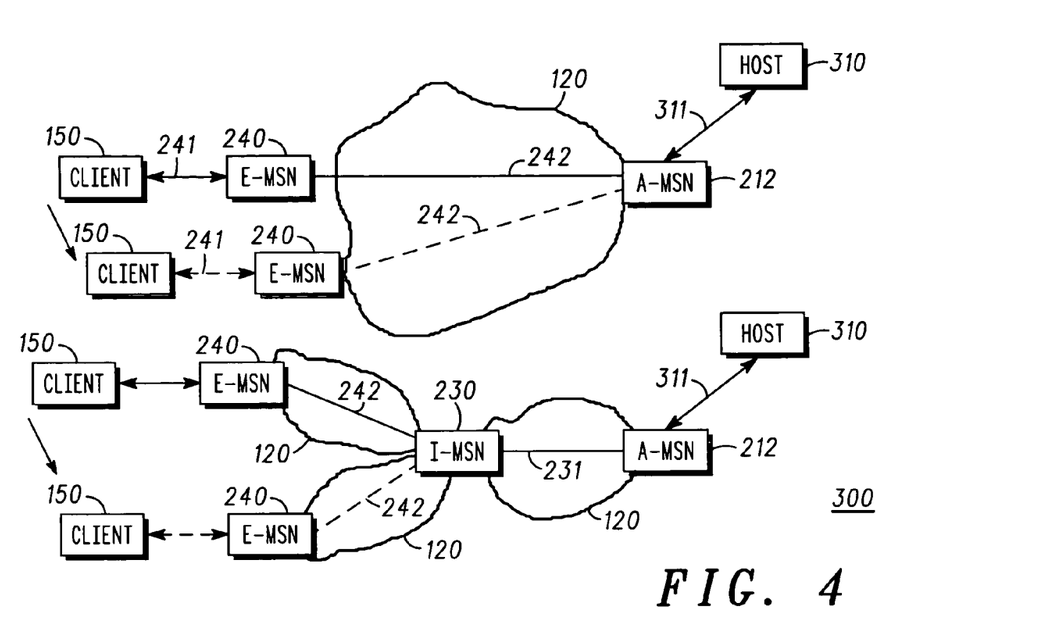
FIG. 4 is a diagram depicting exemplary tunnel configurations in accordance with various exemplary embodiments.

To better understand a mobility architecture in accordance with various exemplary embodiments, it should first be noted that MSNs, such as E-MSNs 240, I-MSNs 230, and A-MSNs 212, are linked to one other via Internet Protocol (IP), or the like, and, as illustrated in FIG. 4, may form a network on a network. It should further be noted that in accordance with principals of the present invention, MSNs need not be L2 connected, they need only be IP connected. MSNs preferably discover each other, for example within the fixed network, using a discovery protocol and signaling to each other using, for example, UDP/IP. In order to carry client traffic, MSNs set up tunnel switched paths, such as, for example, from A-MSN 212 to E-MSN 240.

Each tunnel switched path is preferably made up of a series of concatenated tunnels, where each tunnel spans from one MSN to the next. Unlike tunneling associated with, for example, mobile-IP, a client such as a communication unit preferably does not explicitly participate in mobility at the MSN to MSN tunneling level. A communication unit may participate at a lower level, such as a Radio Resources (RR) level, but such participation is not necessary within the scope of the present description. Thus, FIG. 4, illustrates exemplary scenario 300 where tunnel switching occurs between MSNs in various exemplary configurations thereof. Lines with arrows, such as lines 311 and 241, indicates un-tunnelled traffic paths and lines without arrows such as lines 242 and 231, indicate traffic tunneled between MSNs. Clouds 120 represent IP connectivity between MSNs. When client 150 moves to new E-MSN 240, only the necessary part of the tunnel path is moved. For example, a tunnel switched path may be established between A-MSN 212, I-MSN 230, and E-MSN 240 on tunnel paths 231 between A-MSN 212 and I-MSN 230, and on tunnel path 242 between I-MSN 230 and E-MSN 240. When client 150 moves to a new E-MSN 240, only tunnel path 242 requires modification.

Thus in accordance with various exemplary embodiments, a network on a network may be formed from the MSNs. It will be appreciated by one of ordinary skill that vertices in an exemplary network graph are preferably the MSNs, and the graph edges are IP hops between MSNs. The procedure required to build such a MSN network are summarized herein below. Before traffic connections are made, all MSNs preferably run a discovery protocol to find other MSNs on the network. Periodically, for example, every 10 seconds, an MSN sends a probe packet to a pre-defined Multicast address chosen from the internetwork control block 224.0.1/24 ensuring that the probe packet will be propagated throughout the network. An MSN receiving a probe packet generates a reply directed to the sender containing information about itself. The reply also preferably contains the updated time-to-live (TTL) associated with the probe packet so that the MSN sending the probe can determine the number of IP hops from itself to the other MSN. It will be appreciated that the IP hop count may be used as a link metric for the "link" between MSNs. It will also be appreciated that the discovery protocol is analogous to the adjacency part of OSPF described herein above. After discovery, a routing table is preferably built in, for example, E-MSN 240, I-MSN 230, and A-MSN 212, so that the next upstream or downstream MSN hop for a given A-MSN 212 destination may be known. Assuming a link-state protocol is used, each MSN preferably sends a copy of its adjacency information to all other MSNs in a suitable manner. In OSPF, for example, adjacency information is sent using a flooding protocol. In accordance with various exemplary embodiments, adjacency information may be sent using multicast transmissions as described above in connection with the discovery protocol. Using adjacency information contained in multicast messages or other discovery related messages, each MSN builds a link-state database, which normally describes the network topology completely, and should be identical in each MSN. The complete shortest path to each destination including MSNs is then determined by running a shortest path calculation algorithm such as, for example, Dijkstra's SPF algorithm, on the link-state database. A resulting routing table may then contain, for each A-MSN 212 destination, the next MSN hop of the path towards the destination.

It will be appreciated that, in accordance with various exemplary embodiments, the mobility network should deliver information typically as protocol data units, PDUs, packets, or the like, to communication units such as mobile clients, while hiding the mobility from mobility unaware hosts, routers, nodes, and the like which may be present in the network. To hide mobility, tunnel-switched paths may be established, for example as illustrated in FIG. 4, between the E-MSN 240 serving client 150 which may be a communication unit, or the like, and A-MSN 212. It can be seen that E-MSN 240, and hence the tunnel-switched path portions 242 and/or 231, may change as client 150 moves; but A-MSN 212 never changes while client 150 is active in the network, such as during a communication where information is transferred thereto from, for example, host 310 over a connection 311.

Thus, as noted above, a tunnel-switched path such as tunnel-switched path portion 242 and/or 231 is preferably made up of a concatenation of tunnels, where each tunnel runs from one MSN to another MSN. Tunnel-switched path portion 242 and/or 231 further, preferably follows the shortest path between E-MSN 240 and A-MSN 212 as determined by, for example, an exemplary inter-MSN routing protocol. When client 150 moves, one or more of tunnel portions 242 in the path move however, it is preferable that a minimum number of shortest tunnel portions are moved rather than moving an entire tunnel.

Figure 5:
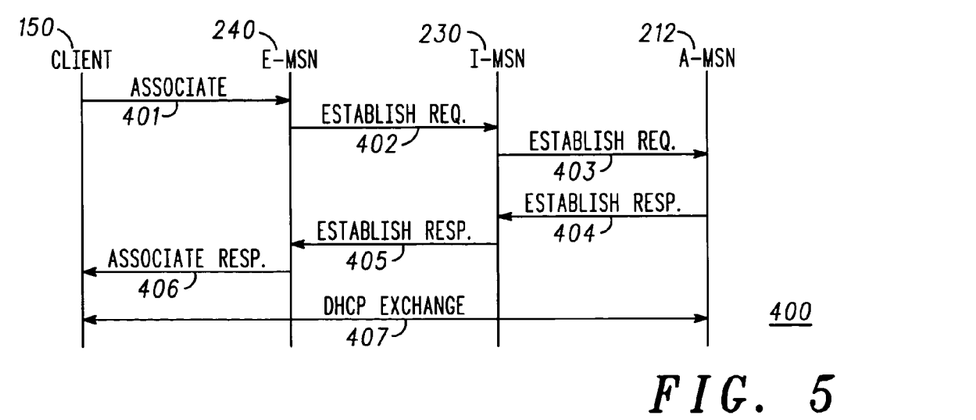
FIG. 5 is a connection setup diagram depicting an exemplary setup for a tunnel switched path in accordance with various exemplary embodiments.

In order to effect setup or movement of the tunnel switched path, a setup procedure is preferably used as illustrated in FIG. 5. The tunnel-switched path setup is preferably performed, for example, when client 150 associates with E-MSN 240. Client 150 associates with E-MSN 240 by way of an ASSOCIATE message 401 in accordance with for example, 802.11. E-MSN 240 creates a context for the Network Access Identifier (NAI) and sends ESTABLISH request message 402 associated with the establishment of a tunnel, to the next MSN hop, such as I-MSN 230 towards the closest A-MSN 212 based on the discover and routing procedures described herein above. It should be noted that ESTABLISH request message 402 contains the NAI associated with client 150, the identity of target A-MSN 212, and the chosen Tunnel ID (TID) for E-MSN 240, for tunnel portion 242.

Generally, a node preferably chooses a TID and sends it to the node that will be sending traffic along the tunnel. I-MSN 230 responds to ESTABLISH request message 402 by creating a context for the NAI, recording the previous MSN hop & TID, and sending ESTABLISH request message 403 associated with the establishment of the tunnel to the next MSN hop towards the target, which is now A-MSN 212. As before, ESTABLISH request message 403 contains the TID chosen by I-MSN 230. A-MSN 212 responds to ESTABLISH request message 403 by creating a context for the NAI, recording the previous MSN hop & TID. A-MSN 212 returns ESTABLISH response message 404 to I-MSN 230 containing the chosen TID for tunnel portion 231 associated with A-MSN 212. I-MSN 230 records the TID associated with A-MSN 212 and propagates ESTABLISH response message 405 to E-MSN 240 completing the association in accordance with, for example, 802.11 and establishing the tunnel switched path between for example, tunnel portion 242 and 231 between E-MSN 230, I-MSN 240, and A-MSN 212. E-MSN 230 may now send all L2 frames received from client 150 up through the tunnel switched path to A-MSN 212. Frames originating from, for example, host 310 may propagate back toward E-MSN 230 through the tunnel switched path in the opposite direction. The tunnel path forms a pseudo-wire connecting client 150 directly to A-MSN 212 as will be described in greater detail hereinafter. If client 150 now engages in Dynamic Host Configuration Protocol (DHCP) exchange 407 involving messages such as for example, DISCOVER, OFFER, REQUEST, ACK, flowing directly between client 150 and A-MSN 212 along the tunnel path, A-MSN 212 may now act as a DHCP server, and may assign client 150 its IP address. Since A-MSN 212 must attract client 150's packets, from, for example, host 310, it must assign client 150's IP address.

Figure 6:
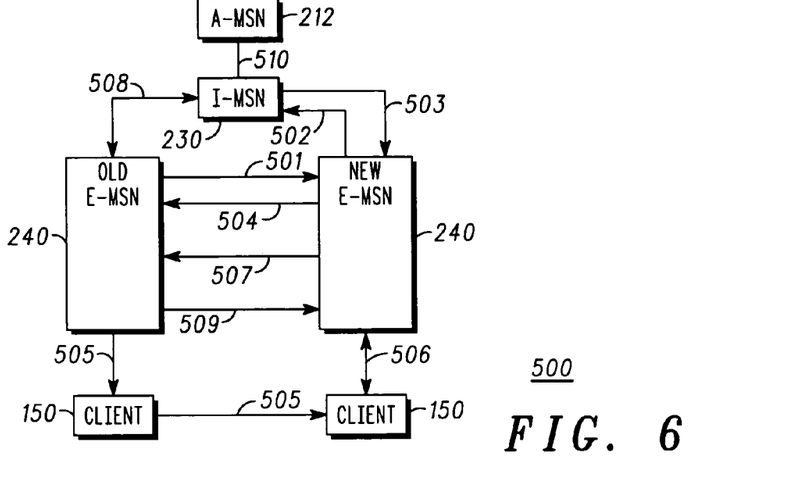
FIG. 6 is a diagram further depicting an exemplary setup for a tunnel switched path in accordance with various exemplary embodiments.

Once a tunnel switched path is established in accordance with the above described procedure, mobility can be facilitated by effecting a handover (HO) or move of the communication, e.g. traffic associated with client 150 and host 310 along at least a portion of the tunnel switched path. A procedure for such a HO is illustrated in FIG. 6 preferably occurring from one exemplary E-MSN 240 to another exemplary E-MSN 240. It should be noted that the handover is preferably "forward", that is, signaling associated with establishment of a new tunnel portion precedes actual HO. Such forward HO minimizes voice interruptions caused by even a small suspension in traffic. As noted above, A-MSN 212 assigns an IP address to client 150 as part of the association procedure described with reference to FIG. 5. A low level mechanism, such as a radio resource (RR) in "old" E-MSN 240 may be used to determine that a move to "new" E-MSN 240 is desired. It will be appreciated that the mechanism used to make the HO decision may be any suitable mechanism at a lower level such as a RR level, and may include the detection of signal parameters such as signal strength, power levels, signal to noise ratios, signal quality, or the like that no longer satisfy, for example fall below, a threshold. The particular threshold will depend on various known factors and can readily be determined via experimentation by one of ordinary skill. In accordance with various alternative exemplary embodiments, the need for a HO can be determined or decided by old E-MSN via direct signal measurements or by client 150. If client 150 decides or determines that a move or HO is desired or necessary, a signal, for example, from client 150 to old E-MSN 240 may actually be used to trigger the HO.

When a suitable HO trigger occurs, old E-MSN 240 sends an HO request to new E-MSN at 501 indicating client 150's NAI and A-MSN 212. The HO request may also contain a security context, or the like, needed by new E-MSN 240 to service client 150. New E-MSN 240 then looks up a route towards A-MSN 212. Since I-MSN 230 is encountered along the first hop towards A-MSN, new E-MSN 240 sends an ESTABLISH request to I-MSN 230 at 502 associated with the tunnel. It should be noted that in accordance with various exemplary embodiments, I-MSN 230 is considered the "crossover MSN", because the existing tunnel path between A-MSN 212 and old E-MSN 240 already runs through it. Accordingly, I-MSN 230 does nothing towards A-MSN 212 and the tunnel therebetween remains in place. I-MSN 230 responds with an ESTABLISH response at 503 and I-MSN 230 begins sending downlink traffic down both old and new tunnel portions such as tunnel portions 242 in FIG. 4. When new E-MSN 240 receives the ESTABLISH response, tunnel setup is complete and an HO request ACK may be sent to old E-MSN 240 at 504, at which point low level signaling, such as RR signaling, may occur between old MSN 240 and client 150 causing client 150 to move to new E-MSN 240 at 505. Client 150 then associates with new E-MSN 240 at 506. New E-MSN 240 then sends HO Complete at 507 to old E-MSN 240 when the new E-MSN 240 is serving the client 150. Old E-MSN 240 may then tear down the old tunnel portion, for example, between itself and I-MSN 230, deleting all contexts such as NAI contexts for client 150. It will be appreciated that the tear-down propagates recursively to I-MSN 230, the crossover MSN, for example, at 508, and is in various embodiments halted there. Old E-MSN 240 then returns an HO Complete ACK at 509 to new E-MSN 240.

In order to achieve maximum transparency for traffic associated with client 150 and host 310, tunnel switched path portions 242 and/or 231 carry L2 frames expeditiously over what amounts to a virtual connection. In accordance with Internet Engineering Task Force (IETF) terminology, tunneling with L2 frames is referred to as "Pseudo-wire End-to-End emulation", or PWE3 as will be described in greater detail herein after. The tunnel encapsulation is preferably Generic Routing Encapsulation over Internet Protocol (GRE/IP), and the "GRE Key" serves as a tunnel ID (TID). The tunnel payload is preferably a complete frame such as an Ethernet or 802.3 frame as discussed, for example, in a document identified as "draft-ietf-pwe3-ethernetencap-00.txf" available through the IETF.

Figure 7:
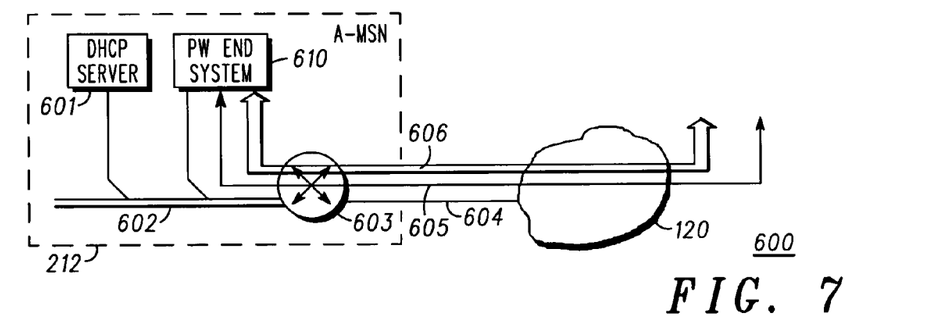
FIG. 7 is a diagram depicting an exemplary mobility service node (MSN) in accordance with various exemplary embodiments.

It will be appreciated that A-MSN 212 could be configured using many standard components as illustrated in FIG. 7. As noted above, a PW is basically a tunnel carrying L2 frames. In accordance with various exemplary embodiments, one PW may be present per associated client 150. PW end system 610 (PWES) is preferably a component supplied by Motorola Incorporated of Schaumburg, Ill. All clients 150 handled by PWES 610 appear to be L2 attached to the subnet associated with client 150. For scalability, multiple PWES 610 boxes may be present on the subnet, and it should further be noted that multiple subnets with PWES 610 boxes on them may also be present. DHCP server 601 is a standard server and assigns addresses from the address range associated with the subnet. Router 603 is also a standard router and advertises routes to core 120 and thus attracts client packets towards the subnet. The working group (WG) associated with PWE3, does not define protocols for setting up PWs, only for encapsulating traffic on a PW, thus PWES 610 in accordance with various exemplary embodiments, would preferably use, for example, inter-MSN protocols which could be proprietary protocols.

Figures 8, 10:
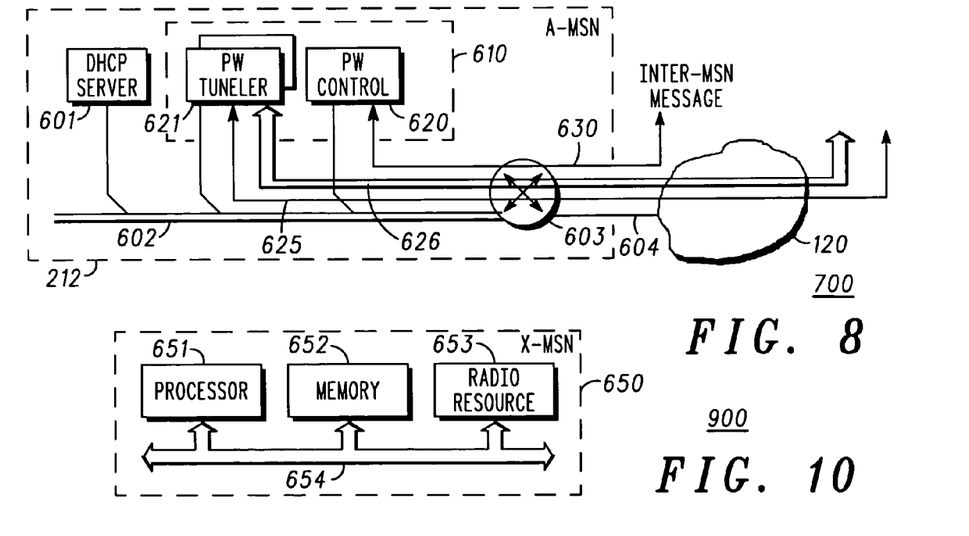
FIG. 8 is a diagram further depicting an exemplary mobility service node (MSN) in accordance with various exemplary and alternative exemplary embodiments.
FIG. 10 is an exemplary block diagram of a Mobility Serving Node.

In accordance with still other exemplary and alternative exemplary embodiments, PWES 610 could further be constructed of two devices as illustrated in FIG. 8. Off the shelf PW tunneler 621 is preferably a "dumb" but fast device for encapsulating traffic according to an internal table or the like. As indicated, several PW tunnelers 621 could be deployed to support higher capacity and achieve redundancy. Tunnels can be set up by manipulating the tables in the PW tunnelers 621 using, for example, inter-MSN protocols 630 orchestrated by PW control 620. In such an approach therefore, PW control 620 may handle control functions advantageously split from the traffic bearer, such as PW tunneler 621. In an exemplary scenario, a device on the client subnet sends a broadcast frame on the subnet, such as an L2 broadcast, which, by definition, is any frame in which the first bit of the destination address is set. A simple approach to handing the scenario would be to have PW tunneler 621 send copies of the frame down all PWs 626 resulting in a large number of redundant frames being sent to each E-MSN 240 and being sent over the air. A preferable approach would include only one copy of the broadcast frame being sent to each E-MSN 240 where at least one PW terminates. However, as will be appreciated, it would be difficult for PW tunnelers 621 to perform such broadcasts because each PW tunneler 621 has only partial knowledge of the full set of tunnels. Thus, in accordance with various exemplary and alternative exemplary embodiments, PW tunnelers 621 do not tunnel any broadcast frames, and instead PW Control 620 tunnels all broadcasts, since it has complete knowledge of the full set of tunnels. The resulting load on PW Control 621 would further be acceptable since broadcast frames are sent infrequently.

It will be appreciated that handling broadcast messages is a challenge for any mobility approach, a notable example would be the handling of L3 broadcasts in Mobile IP. The most common L2 broadcast on a typical subnet is used to carry Address Resolution Protocol ARP Requests. A router will broadcast ARP request messages onto the subnet to translate IP addresses to low level addresses such as MAC addresses. For the purposes of optimization, either the PW Controller 620 or DHCP server 601 could proxy-respond to inbound ARP requests. Such proxy responses would be simple for DHCP server 601 since it typically assigns clients 150 an IP address and knows the lower layer client address such as the L2 address from the DHCP messages exchange described herein above. If the PW Controller 620 proxy responds, mapping of clients would need to be discovered by, for example, querying the DHCP server using an appropriate protocol.

It will be appreciated that the approach described above is intended to be very general. For enterprise applications a full-scale solution is not necessary. For example, in a campus network, transit time from E-MSN 240 to A-MSN 212 is likely to be extremely short, such as, approximately 1 msec. Therefore, there is no need for any I-MSNs. I-MSNs are further undesirable because they would require placement in wiring closets, complicating an installation. Accordingly, an exemplary enterprise network would likely need only E-MSNs 240 and A-MSNs 212 greatly simplifying the inter-MSN routing protocol 630, since an E-MSN 240 would only need to discover the nearest A-MSN 212. For further simplification, the closest A-MSN 212 could be configured into E-MSN 240, assuming there is a mechanism for each network element, including E-MSN 240, to load a config file from, for example, a config server. A simple approach would be to configure E-MSN 240 with A-MSN 212's hostname, whereupon E-MSN 240 would convert the hostname associated with A-MSN 212 to an IP address using a domain name server (DNS). To facilitate load-sharing, the hostname could further map to a list of IP addresses using DNS round-robin.

Figure 9:
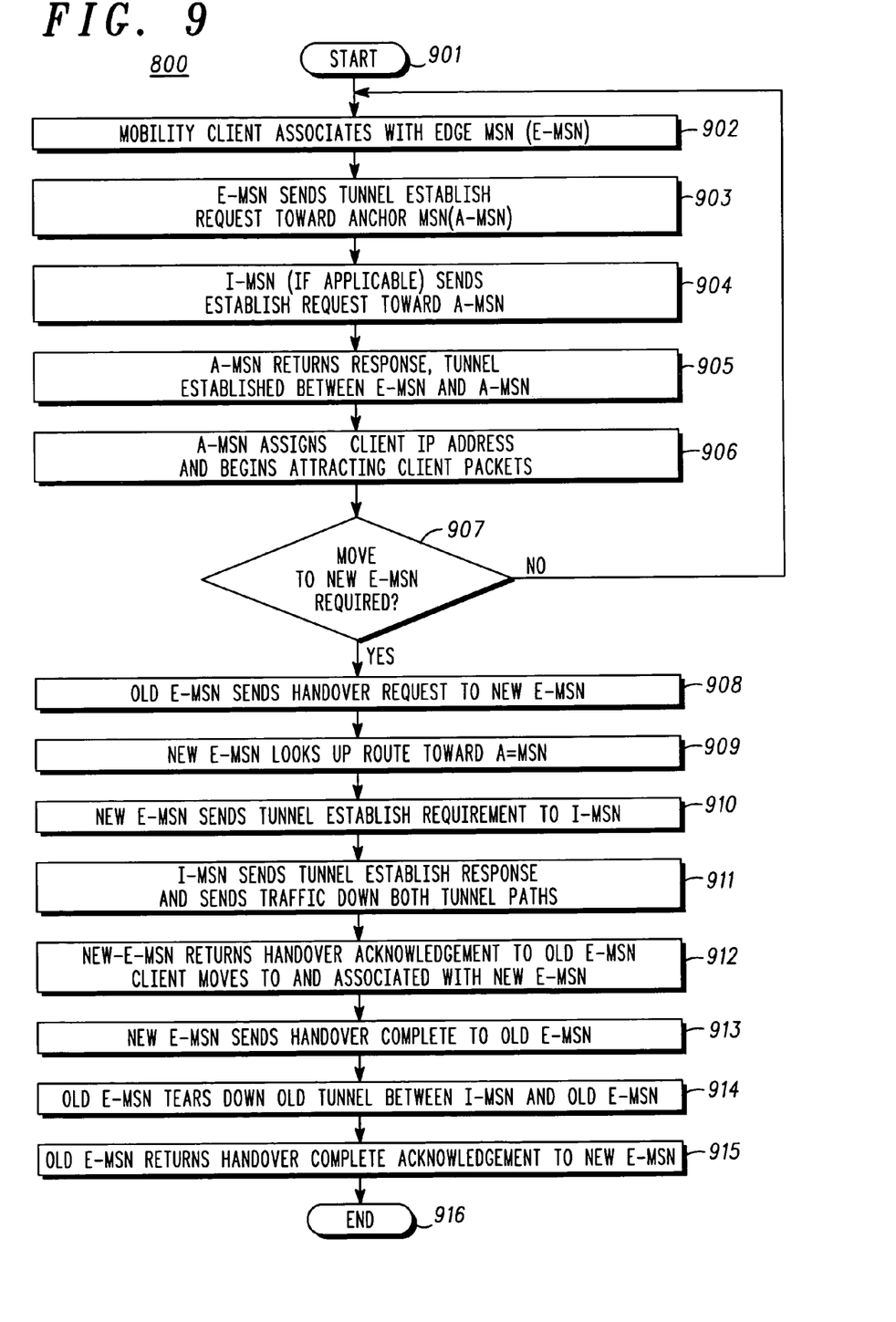
FIG. 9 is a flow chart depicting an exemplary method in accordance with various exemplary embodiments and alternative exemplary embodiments.

It will be useful to review procedures in accordance with various exemplary embodiments by reference to FIG. 9. Starting at 901, a mobility client, such as client 150, may associate with an E-MSN, such as E-MSN 240 at 902. It will be appreciated that for illustrative purposes, it can be assumed that client 150 has either entered the radio range of E-MSN 240, or has just powered on within the radio range of E-MSN 240. The latter scenario is preferable to begin an analysis of the procedure involved in facilitating mobility. E-MSN 204 sends a request to I-MSN 230 to establish a tunnel there between at 903. If I-MSN 230 is not the terminating node of the tunnel and A-MSN 212 is present, I-MSN 230 propagates the request to A-MSN 212 at 904. It will be appreciated that certain actions may be taken by I-MSN 230 and A-MSN 212 as noted above, for example, with reference to FIG. 5 and FIG. 6, such as the establishment of an NAI context for client 150 and the like. A-MSN 212 returns a response to the request for establishment of the tunnel, which propagates to E-MSN 240 through I-MSN 230 if present, and the tunnel is established at 905. A-MSN 212 through, for example, a DHCP exchange as noted above, may assign an IP address for client 150 and may begin to attract packets destined for client 150 from any hosts on the upstream side of A-MSN 212 at 906. When the tunnel is established, information preferably in the form of packets, frames or the like preferably Layer 2 packets, frames, or the like may be freely transferred to and from client 150.

Communication in such a manner may proceed for the duration of the session if client 150 is stationary, however, if we assume client 150 may move, then a test may periodically or continuously be performed, or a trigger or other signal may be anticipated indicating that a move may be necessary at 907. When a determination is made that a move is required to a new E-MSN 240, such as a signal from a radio resource, a handover request may be issued to the new E-MSN 240 at 908. The new E-MSN 240 as noted above, may establish an NAI context for client 150 and look up a route to A-MSN 212 at 909. New E-MSN 240 sends a request to I-MSN 230 to establish a tunnel there between at 910. I-MSN 230 then sends a tunnel establish response to new E-MSN 240 and begins sending traffic down both tunnel portions to new E-MSN 240 and old E-MSN 240 911. New E-MSN 240 returns the handover acknowledge to old E-MSN 240 and client 150 associates with new E-MSN 240 at 912. Once client 150 begins receiving traffic associated with the session, new E-MSN 240 sends a handover complete message to old E-MSN 240 at 913, whereupon old E-MSN 240 may tear down the tunnel portion between itself and I-MSN 230 at 914. Old E-MSN returns a handover complete acknowledge to new E-MSN 240 at 915, whereupon the mobility facilitating procedures ends at 916. It will be appreciated that while one mobility handover has been described above, a series of handovers are possible during one session in which case, the procedure above may be repeated as necessary.

It will be appreciated that, for illustrative purposes such as shown in scenario 900, an exemplary MSN 650, in accordance with various embodiments, may minimally be made up of elements shown in FIG. 10, such as processor 651, memory 652, and radio resource 653, which elements may be interconnected to each other and to other elements or nodes not shown through a connection such as, for example, bus 654. Generally the memory is used for storing instructions or software routines that when executed by the processor cause the processor to control and cooperatively operate with the radio resource and other elements so as to send, receive, interpret and so forth the various messages, discussed above, that are exchanged with other MSNs. It will further be appreciated that network connections may be made to other elements through a network interface, or the like, well known in the art and thus not shown, which network interface, or the like, would nonetheless prepare data to be transferred to and from elements of exemplary MSN 650 over bus 654.

It will further be appreciated that a 802.1x security architecture may be used for clients 150 while a network authentication protocol such as Kerberos or the like, may be used for securing network elements. To provide a Quality of Service (QoS) architecture Diffserv is preferably used with tunnels. In accordance with various exemplary embodiments, Intserv may not be supported additional complexity would be required to do so. The outer IP header will be marked using a Differential Services Code Point (DSCP) derived from the 802.1p Class of Service (CoS) of the L2 frame being tunneled. The mapping from CoS to DSCP will preferably be dynamically configured in E-MSN 240 and A-MSN 212 although a default mapping would probably cover most of the anticipated cases. As noted above, a management architecture may be implemented using a config file server.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, in an edge Mobility Services Node (MSN), for facilitating the mobility of a communication unit during a communication between the communication unit and a host, the host directing information to the communication unit using a higher layer address thereof, the communication established over a tunnel switched path, the tunnel switched path associated with the communication unit using a lower layer address thereof, the tunnel switched path carrying information associated with the communication between the communication unit and the host, the method comprising:

determining that a move of the communication to an adjacent MSN is desired to facilitate the mobility of the communication unit;

initiating a modification of the tunnel switched path to a modified tunnel switched path associated with the adjacent MSN and the lower layer address while the information is transferred to the edge MSN on the tunnel switched path; and releasing the tunnel switched path after the modified tunnel switched path is established and supporting the communication on the modified tunnel switched path.

2. A method according to claim 1, further comprising discovering at least the adjacent MSN and an intermediate MSN, the adjacent MSN and the intermediate MSN capable of facilitating the mobility of the communication unit by being capable of establishing at least a portion of the modified tunnel switched path.

3. A method according to claim 1, wherein the lower layer address includes a MAC address.

4. A method according to claim 1, wherein the determining includes determining that a signal parameter for a signal between the communication unit and the edge MSN does not satisfy a threshold value.

5. A method according to claim 1 wherein the initiating the modification of the tunnel switched path further comprises sending a handover request to the adjacent MSN and receiving a handover request acknowledgment from the adjacent MSN.

6. A method according to claim 1 wherein the releasing the tunnel switched path further comprises receiving a handover complete message from the adjacent MSN after the communication unit is being served by the adjacent MSN.

7. A method, in an edge Mobility Services Node (MSN), for facilitating the mobility of a communication unit during a communication between the communication unit and a host, the communication established over a tunnel switched path, the tunnel switched path associated with an adjacent MSN and the communication unit using a lower layer address thereof, the tunnel switched path carrying information associated with the communication between the communication unit and the host, the method comprising:

determining that a move of the communication to the edge MSN from the adjacent MSN is desired for the mobility of the communication unit;

establishing a modification of the tunnel switched path to a modified tunnel switched path associated with the edge MSN and the lower layer address while the information is transferred to the adjacent MSN on the tunnel switched path; and     establishing the communication over the modified tunnel switched path before the tunnel switched path is released.

8. A method according to claim 7, further comprising discovering an intermediate MSN that is capable of facilitating the mobility of the communication unit by being capable of establishing at least a portion of the modified tunnel switched path.

9. A method according to claim 7, wherein the lower layer address includes a MAC address.

10. A method according to claim 7, wherein the determining includes receiving an indication that a signal related parameter associated with a signal at the communication unit does not satisfy a threshold value.

11. A method according to claim 7, wherein the establishing the modification of the tunnel switched path further comprises receiving a handover request from the adjacent MSN, sending an establish request to an intermediate MSN, and receiving an establish response from the intermediate MSN.

12. A method according to claim 11, wherein the establishing the communication over the modified tunnel switched path further comprises sending a handover request acknowledgment to the adjacent MSN, associating with the communication unit, sending a handover complete message to the adjacent MSN, and receiving a handover complete acknowledgment from the adjacent MSN.

13. A method, in an intermediate Mobility Services Node (MSN), for facilitating the mobility of a communication unit during a communication between the communication unit and a host, the communication established over a tunnel switched path, the tunnel switched path associated with the communication unit using a lower layer address thereof, the tunnel switched path carrying information associated with the communication between the communication unit and the host, the method comprising:

processing a message associated with a modification of a downstream portion of the tunnel switched path from between the intermediate MSN and a first MSN to between the intermediate MSN and an adjacent MSN;

modifying the downstream portion of the tunnel switched path to establish a modified tunnel switched path associated with the adjacent MSN and the lower layer address;

transferring the information to the adjacent MSN on the modified tunnel switched path; and     releasing the downstream portion of the tunnel switched path after the modified tunnel switched path is established.

14. A method according to claim 13, further comprising discovering other MSNs that are capable of facilitating the mobility of the communication unit by being capable of establishing at least a portion of the modified tunnel switched path.

15. A method according to claim 13, wherein the lower layer address includes a MAC address.

16. A method, in an anchor Mobility Services Node (MSN), for facilitating the mobility of a communication unit during a communication between the communication unit and a host, the communication established over a tunnel switched path, the tunnel switched path including an edge MSN, the tunnel switched path associated with the communication unit using a lower layer address thereof, the tunnel switched path carrying information associated with the communication between the communication unit and the host, the method comprising:

receiving the information from the host, the information directed from the host to the communication unit using an IP address thereof, and directing the information to the communication unit on the tunnel switched path using the lower layer address; and     directing the information from the host to the communication unit using an IP address thereof on a modified tunnel switched path using the lower layer address;

wherein the modified tunnel switched path includes an adjacent MSN.

17. A method according to claim 16, further comprising discovering at least the adjacent MSN and an intermediate MSN, the adjacent MSN and the intermediate MSN capable of facilitating the mobility of the communication unit by being capable of establishing at least a portion of the modified tunnel switched path.

18. A method according to claim 16, wherein the lower layer address includes a MAC address.

19. A Mobility Services Node (MSN) for facilitating the mobility of a communication unit during a communication between the communication unit and a host, the host directing information to the communication unit using a higher layer address thereof, the communication established over a tunnel switched path, the tunnel switched path associated with the communication unit using a lower layer address thereof, the tunnel switched path carrying information associated with the communication between the communication unit and the host, the apparatus comprising:

a radio resource;

a memory; and a processor coupled to the memory and the radio resource, the memory storing instructions for causing the processor to:

determine that a move of the communication is desired to facilitate the mobility of the communication unit;

initiate a modification of the tunnel switched path to a modified tunnel switched path associated with the lower layer address while the information is transferred on the tunnel switched path; and         release the tunnel switched path after the modified tunnel switched path is established and supporting the communication on the modified tunnel switched path.

20. An MSN according to claim 19, wherein the instructions further cause the processor to discover other MSNs that are capable of facilitating the mobility of the communication unit by establishing a portion of one of the tunnel switched path and the modified tunnel switched path.

21. An MSN according to claim 19, wherein the instructions, in causing the processor to determine, further cause the processor to receive an indication from the radio resource that a signal parameter associated with a signal at the communication unit does not satisfy a threshold value.

22. An MSN according to claim 19 operating as a serving edge MSN wherein the processor caused to initiate the modification of the tunnel switched path is further caused to send, via the radio resource, a handover request to an adjacent MSN and receive a handover request acknowledgment from the adjacent MSN.

23. An MSN according to claim 19, operating as a serving edge MSN wherein the processor caused to release the tunnel switched path is further caused to receive, via the radio resource, a handover complete message from an adjacent MSN after the communication unit is being served by the adjacent MSN.

24. An MSN according to claim 19, operating as an edge MSN to accept a handover of the communication with the communication unit wherein the processor caused to initiate the modification is further caused to establish the modification of the tunnel switched path by cooperatively operating with the radio resource to receive a handover request from an adjacent serving edge MSN, send an establish request to an intermediate MSN, and receive an establish response from the intermediate MSN.

25. An MSN according to claim 24, wherein the processor is caused to release the tunnel switched path by cooperatively operating with the radio resource to send a handover request acknowledgment to the adjacent serving MSN, associate with the communication unit, send a handover complete message to the adjacent MSN, and receive a handover complete acknowledgment from the adjacent MSN.

\* \* \* \* \*